United States Patent [19]
Backlin

[11] 4,239,303
[45] Dec. 16, 1980

[54] FULL CONTACT CRANKSHAFT BEARING

[75] Inventor: Robert R. Backlin, Dolton, Ill.

[73] Assignee: Allis-Chalmers Corporation, Milwaukee, Wis.

[21] Appl. No.: 965,945

[22] Filed: Dec. 4, 1978

[51] Int. Cl.³ .......................... F16C 17/10; F16C 3/06
[52] U.S. Cl. .................................. 308/167; 308/237 R
[58] Field of Search ................... 308/23, 167, 237 R, 308/240

[56] References Cited
U.S. PATENT DOCUMENTS

| | | | |
|---|---|---|---|
| 1,026,849 | 5/1912 | Coffin | 308/23 |
| 1,327,301 | 1/1920 | Watson | 308/237 R |
| 1,460,515 | 7/1923 | Selker | 308/237 R |
| 1,581,083 | 4/1926 | Gilman | 308/237 R |
| 1,649,258 | 11/1927 | Rummins | 308/237 R |
| 1,662,901 | 3/1928 | Ripley | 308/237 R |
| 2,266,320 | 12/1941 | Hobbs | 308/237 R |

FOREIGN PATENT DOCUMENTS 1078076  11/1954  France .................. 308/237 R

*Primary Examiner*—Richard R. Stearns
*Attorney, Agent, or Firm*—Arthur L. Nelson

[57] ABSTRACT

A bushing type bearing having bearing shells with fillet radii mating or slightly smaller than the fillet radii of the crankpin or piston pin to increase effective bearing surfaces for carrying greater bearing loads.

10 Claims, 8 Drawing Figures

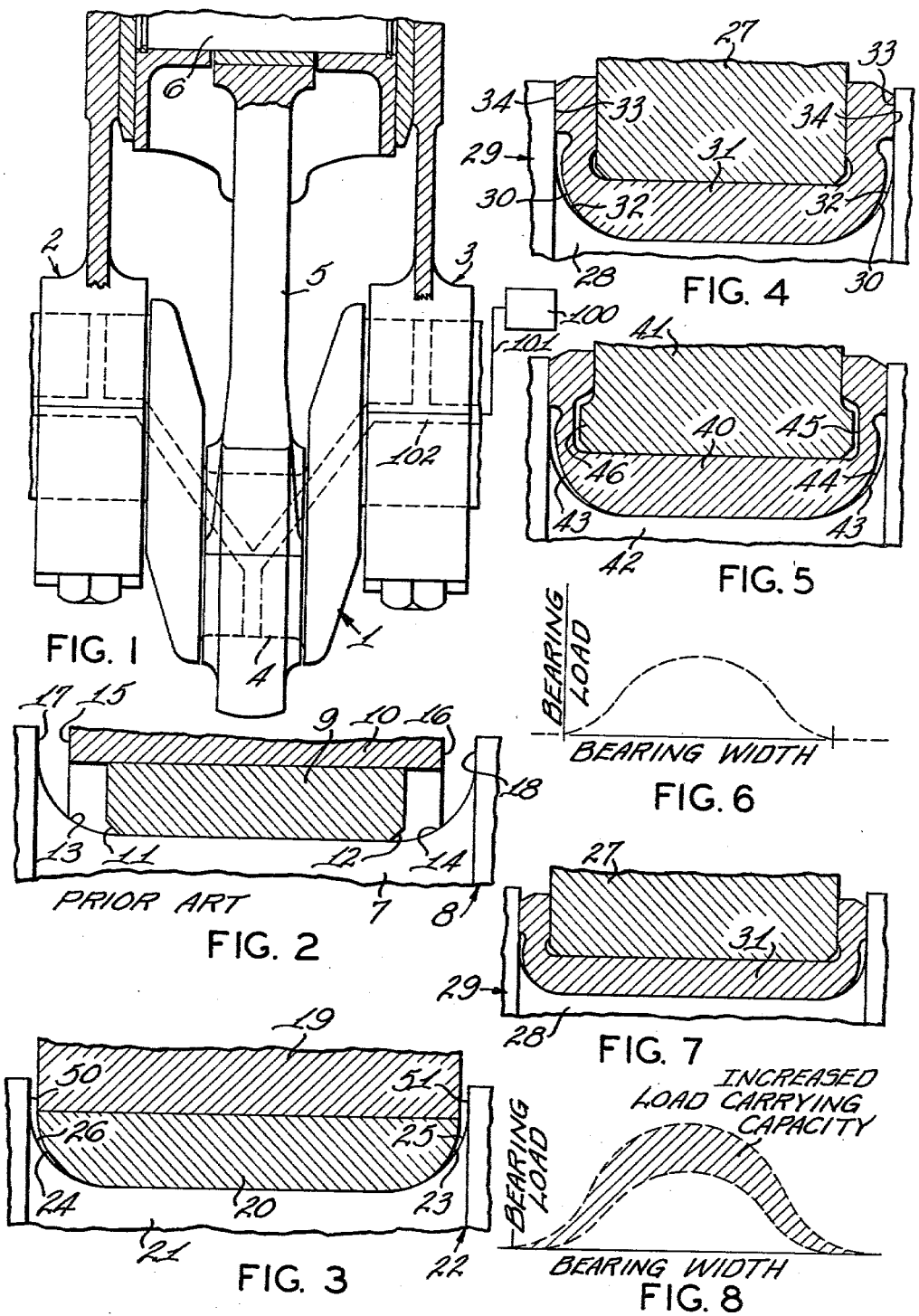

FULL CONTACT CRANKSHAFT BEARING

This invention relates to bearings and more particularly to crankpin bushing shell type bearings in which the bushing shells have fillet radii equal to or slightly smaller than the fillet radii of the crankpin. This type of bearing increases the load carrying capacity of the bearing by utilizing the maximum bearing width for load carrying capabilities.

This invention covers bearing shells or bushings on bearings of reciprocating engines or compressors particularly on the crankpin end of the connecting rod. The crankpin end is subjected to very high unit loading both from the gas pressure on the piston from above and from the high inertia loads of the pistons.

Conventional bearings used with bearing shells usually are formed with a small chamfer on each of the bushings to clear the crankpin fillet radii. The crankshaft usually requires large pin and main fillet radii to reduce the stresses at this critical portion of the crankshaft. Because of these crankshaft requirements, the connecting rod bearing shell width is necessarily compromised. For the particular crankpin diameter, the connecting rod bearing shell should be at least three-tenths of the diameter in width for effective load carrying ability.

Most modern compact engines and compressors do not have the luxury of this amount of room available. The life of the connecting rod bearing shell is, therefore, shortened by reducing the rod bearing width.

Since the connecting rod is usually located axially in the engine by the crankpin walls and allowed to float on the piston pin or wrist pin, the relationship between the crankshaft pin jounals defined by the distance between the crankshaft pin journal walls; i.e., crankshaft pin journal width plus two crankshaft pin fillet radii, and the connecting rod bottom end width is held very closely, usually within a few thousands of an inch. Because of this close captive relationship of the connecting rod and the crankpin journal, it allows the designer to design special bearings which now may take advantage of the full allowable bearing area including the projected surface areas of the fillet radii.

In the case of a typical series of diesel engines in two hundred cubic inch to eight hundred cubic inch category, the increased projected bearing area which resulted from this idea shows over thirty percent increase in load carrying area. Even though the thicker lube oil films near the ends of the bearings are the inconsequential result of required clearances due to crankpin fillet radii tolerances, the fact that this oil is trapped by the bearing thrust surfaces or rod thrust surfaces above the fillet makes this part of the bearing still a load carrying portion.

The addition of these end effects also will dramatically improve the load carrying ability of the remainder of the bearing.

Accordingly, this invention utilizes the total projected area of the crankpin or wrist pin bearing surfaces.

It is an object of this invention to provide bushing bearings having bearing shells with fillet radii.

It is another object of this invention to provide crankpin bearing shells with fillet radii equal to or slightly smaller than the crankpin fillet radii.

It is a further object of this invention to provide crankpin and piston pin bearings having bushing shells with fillet radii equal to or slightly smaller than the fillet radii of the crankpin or piston pin utilizing the total width for load carrying capacity.

The objects of this invention are accomplished by providing complementary bushing shells for crankpins or wrist pins in which the fillet radii of the bushing shells are equal to or slightly smaller than the fillet radii of the crankpin or wrist pin. The reduced clearance on the side of the bearings allows increased effective width of the bearing surface for greater load carrying capacity. The projected surface of the radii, although not the identical radii, trap the oil producing a load carrying surface of the projected radii over the crankpin or wrist pin bearing. The increased effective load carrying capacity increases the life of the bearing.

Referring to the drawings, the preferred embodiment of this invention is illustrated.

FIG. 1 is a side elevation view of a crankshaft and connecting rod bearing with a connecting rod connected to a piston.

FIG. 2 is a cross section view of a conventional crankpin bearing.

FIG. 3 is a cross section view of the preferred embodiment of this invention.

FIG. 4 is a cross section view of a modification of this invention.

FIG. 5 is another modification of this invention.

FIG. 6 is a load carrying diagram of FIG. 2.

FIG. 7 is a modification generally the same as shown in FIG. 5.

FIG. 8 is a load carrying diagram showing the increased load carrying capability of the modification shown in FIG. 7.

Referring to FIG. 1, the crankshaft 1 is mounted on the main bearings 2 and 3. The crankpin 4 is connected to the connecting rod 5 which extends upwardly to connect to the wrist pin 6. The engine 100 drives a lubricant pump to provide forced lubrication through conduit 101 and passages 102 to lubricate main and crankpin bearings.

FIG. 2 is a cross section view of a conventional crankpin bearing. The crankpin 7 of the crankshaft 8 rotates in complementary bushing shells 9 of which one is shown. The connecting rod 10 is connected to the crankshaft to operate in a manner as shown in FIG. 1. The bushing shell 9 is formed with chamfers 11 and 12 to clear the fillet radii 13 and 14 and the connecting rod 10 free-floats on the crankpin 7 with the sides of the connecting rods 15 and 16 engaging the crankpin walls 17 and 18.

FIG. 3 illustrates the preferred embodiment of this invention in which the connecting rod 19 retains the bushing shells 20 of which one is shown which embrace the crankpin 21 of the crankshaft 22. Bushing shell 20 is provided with fillets 23 and 24 which are of slightly smaller radius than the fillets 25 and 26 of the crankpin. The connecting rod width of the bottom end is held very closely, within a few thousands of an inch of the crankpin walls. For the purpose of illustration, a greater clearance is shown. Since the clearance is very small and oil is trapped, the projected surface area of the fillets are effective load carrying area of the bearing.

FIG. 4 illustrates a modification in which the connecting rod 27 is journalled on the crankpin 28 of the crankshaft 29. The fillet radii 30 of the bushing shell 31 is slightly smaller than the fillet radii 32 of the crankpin 28. The crankpin end walls 33 run between end surfaces 34 of the shell 31 with up to a few thousands of an inch clearance. This limits the relative axial movement between the connecting rod 27 and the crankpin 28.

FIG. 5 illustrates another modification of this invention in which the shell 40 on the connecting rod 41 is journalled on the crankpin 42. The fillet radii 43 of the shell 40 fits within the fillet radii 44 of the crankpin 42. A recess 45 receives the abutment 46 of the connecting rod 41 with a slight relief between the two elements.

FIG. 6 illustrates load carrying capability of the conventional crankpin bearing shown in FIG. 2. The load carrying capability is distributed across the crankpin with maximum load carried on the center portion and decreasing to zero at the chamfer of the conventional bearing.

Load distribution is also shown in FIG. 8 in which the increased load carrying capability as shown in the shaded area. This increased load capacity is distributed across the crankpin bearing and the oil film which is trapped between the fillet radii provides additional load carrying capability which is utilized to increase the total load capability of the bearing. With the increased load carrying capability of the bearing, the life of the bearing and the bushing shells are increased over conventional bearings. This is particularly advantageous in engines where the space limitations are critical.

The operation of this invention will be described in the following paragraphs.

The crankpin bearing as shown in FIG. 3 and the subsequent modifications are illustrations of crankpin bearings. A wrist pin bearing might also use the advantages of this type of a bearing to increase its load carrying capability. The connecting rod 19 embraces bushing shells 20 of which the one shown is formed with fillet radii 23 and 24. Fillet radii 23 and 24 are equal to or slightly smaller than the fillet radius 25 and 26 of the crankpin 21. The crankpin end walls 50 and 51 limit the relative axial movement between the connecting rod 19 and the crankpin 21. The lubricating oil retained trapped between the fillet radii 23 and 24 of the bushing shell 20 and the radii 25 and 26 of the crankpin 21 also acts as a cushion against the relative lateral movement of the connecting rod 19 and the crankpin 21 as well as providing partial load carrying capability.

Similarly, FIGS. 4 and 5 show a similar bearing with fillet radii on the bushing shell 31 or 40 as well as the crankpin 28 or 42. The bushing shell 31 is also provided with the lateral surfaces 34 which engage the end walls 33 of the crankpin to limit the movement of the bushing laterally. Lubricating oil is also trapped between the fillet radii 32 of the crankpin 28 and/or 29 and fillet radii 30 of the shell 31 which provides assistance in load carrying capability of the bearing. The bearings are provided with forced lubrication and this lubrication is trapped within the bearing and provides an oil film between the metal surfaces of the shell 31 and the crankpin 28.

The embodiments of the invention in which an exclusive property or privilege is claimed are defined as follows:

1. A journal bearing comprising, a journal, two complementary bushing shells, said journal defining fillet radii to reduce the journal stress at the ends of said journal, fillet radii of smaller radii on said bushing shells providing a gradually increasing clearance between fillets from a lubricating oil film thickness on the axial journal surface to the radial portions of the fillets, a restricted flow passage means defined by abutment surfaces located axially outwardly from the extreme radial portions of said bushing shell fillets for trapping oil to increase the bearing load carrying capacity substantially across the full width of said journal bearing.

2. A journal bearing as set forth in claim 1 including end walls at the ends of the said journal bearing engaging the bushing shells to limit the relative transverse movement between the bushing shells and the journal of said journal bearing.

3. A journal bearing as set forth in claim 1 wherein said journal is a crankpin defining end walls, side surfaces on said bushing shells engaging said crankpin end walls limiting the relative lateral movement between said bushing shells and said crankpin.

4. A journal bearing as set forth in claim 1 wherein said journal defines a crankpin forming sidewalls at the ends of said crankpin bearing, side surfaces on said bushing shells defining limited clearance between said bushing shells and said crankpin and cavities between radii to trap lubricating fluid between radii whereby the fillet radii provide partial load carrying capability of said journal bearing.

5. A journal bearing as set forth in claim 1 wherein said fillet radii of said bushing shells and said journal define limited clearance to partially trap lubricating fluid to provide a cushioning of relative movement between said bushing shells and said journal.

6. A journal bearing as set forth in claim 1 wherein said journal defines a crankpin of a crankshaft having end walls, said bushing shells define a clearance of a few thousands of an inch between the sides of said bushing shells and said end walls of said crankpin to retain a lubricating film at the ends of said journal bearing.

7. A journal bearing as set forth in claim 1 including a connecting rod receiving said bushing shells said shells define recesses receiving retainer abutments on said connecting rod.

8. A journal bearing as set forth in claim 1 wherein said journal defines a crankpin having forced lubrication passages, said bushing shells define bushing segments forming restricted flow clearance passages between the ends of said bushing segments and walls on the end of said crankpin.

9. A journal bearing as set forth in claim 1 including a connecting rod embracing said bushing shells.

10. A journal bearing as set forth in claim 1 wherein said journal defines a crankpin having end walls, a connecting rod embracing said bushing shells, said bushing shells defining end surfaces forming a limited clearance with said end walls, a forced lubricating system, said walls and surfaces trapping lubricating fluid of the forced lubrication system to increase load carrying capacity of said bearing.

* * * * *